US010812351B2

(12) United States Patent
Rose et al.

(10) Patent No.: US 10,812,351 B2
(45) Date of Patent: Oct. 20, 2020

(54) SYSTEM AND METHOD FOR CYBER SENSING FOR POWER OUTAGE DETECTION

(71) Applicant: Massachusetts Institute of Technology, Cambridge, MA (US)

(72) Inventors: Charles Rose, Cambridge, MA (US); Adam Norige, Mansfield, MA (US); Kendra Kratkiewicz, Shirley, MA (US); Ezra Dantowitz, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 149 days.

(21) Appl. No.: 15/902,908

(22) Filed: Feb. 22, 2018

(65) Prior Publication Data

US 2018/0241646 A1 Aug. 23, 2018

Related U.S. Application Data

(60) Provisional application No. 62/461,941, filed on Feb. 22, 2017.

(51) Int. Cl.
*H04L 12/26* (2006.01)
*H04L 12/24* (2006.01)

(52) U.S. Cl.
CPC ............ *H04L 43/045* (2013.01); *H04L 41/12* (2013.01); *H04L 43/0811* (2013.01); *H04L 43/10* (2013.01)

(58) Field of Classification Search
CPC combination set(s) only.
See application file for complete search history.

(56) References Cited

U.S. PATENT DOCUMENTS

2015/0215177 A1* 7/2015 Pietrowicz ............ H04L 43/106
370/230

OTHER PUBLICATIONS

Dainotti et al., Analysis of Country-Wide Internet Outages Caused by Censorship, Dec. 2014, IEEE/ACM Transactions on Networking, vol. 22, No. 6 (Year: 2014).*
Durumeric, Zakir, et al; "ZMap: Fast Internet-wide Scanning and Its Security Applications." Usenix Security. vol. 2013.
(Continued)

*Primary Examiner* — Justin T Van Roie
(74) *Attorney, Agent, or Firm* — Peter A. Nieves; Sheehan Phinney Bass & Green PA

(57) ABSTRACT

A method for cyber sensing for power outage detection includes receiving a selected geographic region for detection and monitoring of power outages; gathering Internet Protocol (IP) network addresses of IP networks within the geographical region; filtering the gathered IP network addresses of IP networks within the geographical region, wherein the gathered IP network addresses of IP networks within the geographical region are referred to herein as geo-relevant IP network addresses; calculating a baseline value for each geo-relevant IP network; scanning the filtered geo-relevant IP network once per predefined time interval, so that each individual IP address within each geo-relevant IP network is tested for response and determining how many devices within the geo-relevant IP network positively respond to the testing; periodically repeating the step of scanning and comparing scan results; and displaying results of scanning.

27 Claims, 4 Drawing Sheets

(56) References Cited

OTHER PUBLICATIONS

Dainotti, A.; "Extracting benefit from harm: using malware pollution to analyze the impact of political and geophysical events on the Internet;" ACM SIGCOMM Computer Communication Review 42.1: 31-39. 2012.
The Edison Foundation Institute for Electric Innovation; 3. "Utility-Scale Smart Meter Deployments: Building Block of the Evolving Power Grid.", 2014.
Schulman, Aaron, and Neil Spring; "Pingin' in the rain." Proceedings of the 2011 ACM SIGCOMM conference on Internet measurement conference. ACM, 2011.

* cited by examiner

SYSTEM AND METHOD FOR CYBER SENSING FOR POWER OUTAGE DETECTION

CROSS-REFERENCE TO RELATED APPLICATIONS

This application claims the benefit of U.S. Provisional Patent Application Ser. No. 62/461,941, Filed Feb. 22, 2017, entitled, "Cyber Sensing For Power Outage Detection," which is incorporated by reference herein in its entirety.

STATEMENT REGARDING FEDERALLY SPONSORED RESEARCH OR DEVELOPMENT

This invention was made with Government support under Grant No. FA8721-05-C-0002 awarded by the U.S. Air Force. The Government has certain rights in the invention.

FIELD OF THE INVENTION

The present invention relates to power outage detection, and more particularly, to detecting the physical locations of power outages.

BACKGROUND OF THE INVENTION

Power outages are not only inconvenient, but with recent catastrophic weather causing vast power outages over many regions, it is vital to be able to assess and address power outages in a time efficient manner.

Currently, in the United States (U.S.), power outages are sensed by electric utilities in two ways. Approximately forty-three percent (43%) of U.S. households are equipped with advanced metering infrastructure (AMI), which are electricity usage meters that have two way communication ability with the electric utility. For the majority of these AMI equipped homes, the electric utilities can sense power outages in near real-time using the AMI sensing capabilities. The other 57% of U.S. households have meters that cannot communicate directly with the electric utilities. In these areas, electric utilities rely on customer reporting, such as, but not limited to, through phone calls and social media, to determine which areas are without power. This method can result in significant delays and poor accuracy when determining if power outages exist and which areas are impacted. Beyond these manual reporting processes, no automated sensing methods exist.

In order to understand the widespread impact of power outages at the multiple utility scale, such as, for example, on the state or regional level, outage information must be collected and amalgamated from multiple electric utilities. Two major difficulties exist in combining the outage data. First, there are no standards for reporting power outage data indicating number or percentage of customers without power and in which locations. These disparate datasets must be processed individually to produce a single product that can provide broad situational awareness. Second, there are many electric utilities even at the state level, which results in long processing times, meaning delays between receiving new data and producing a new geospatial power outage product that can be effectively used.

SUMMARY OF THE INVENTION

Embodiments of the present invention provide a system and method for cyber sensing for power outage detection. Briefly described in architecture, the present system contains a user workstation that may be used by a user for interacting in accordance with the present system and method. The user workstation provides a user interface necessary to interact with the system (e.g. to specify a geographic area of interest, desired geographic boundary units, which results to visualize, viewing the results, etc.). A geographic server communicates with the user workstation and provides for gathering of IP addresses of devices and sets of such IP addresses, referred to as IP network addresses, within a user specified geographical region (also referred to herein as a network whitelist), creating of a pre-incident baseline of geo-relevant IP network addresses, providing the network whitelist to scanners, storing new measurement results, analyzing the new measurement results, calculating a percentage of normal operation, and visualizing results for the user in accordance with selected geographic regions of interest.

Scan servers are provided within the network, which support the process of scanning networks identified in the network whitelists. They may reside locally or remotely, potentially in a data center or cloud service and require sufficient network bandwidth to send and receive scan probes at a specified rate without losing network packets. The scan probes travel through the Internet to devices with IP addresses that belong to the networks in the network whitelist, which reside in towns and cities within the targeted geographic region selected by the user. The scan responses travel back through the Internet from the scanned devices to the scan servers.

Referring to the present method, the method for cyber sensing power outage detection includes receiving a selected geographic region for detection and monitoring of power outages; gathering Internet Protocol (IP) network addresses of IP networks within the geographical region; filtering the gathered IP network addresses of IP networks within the geographical region, wherein the gathered IP network addresses of IP networks within the geographical region are referred to herein as geo-relevant IP network addresses; calculating a baseline value for each geo-relevant IP network; scanning the filtered geo-relevant IP network once per predefined time interval, so that each individual IP address within each geo-relevant IP network is tested for response and determining how many devices within the geo-relevant IP network positively respond to the testing; periodically repeating the step of scanning and comparing scan results; and displaying results of scanning.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Reference will now be made in detail to embodiments of the present invention, examples of which are illustrated in the accompanying drawings. The present system and method provides for real-time physical location detection of power outages. While beneficial for different reasons and in different situations, the present system and method is particularly beneficial in situations of disaster relief. By using power distribution information the present system and method provides such real-time measurement for immediate response. This system and method can provide a single dataset of power outages that spans many electric utilities with lower latency and faster update rates than what is possible with current methods.

The present system and method uses data from communication networks as a proxy for power availability from infrastructure. Data from communication networks can be defined as passive network traffic monitoring or actively interrogating network segments to determine which devices are present. As described in detail herein, the network data can be combined with geospatial metadata about the network to derive geospatial device availability information. This geospatial device availability information can provide information about the power infrastructure, and the present system and method discovers and uses only ports highly correlated with power status, comparing results to a precomputed baseline, and aggregating results across networks within geographic reporting boundaries, utilizing high accuracy network metadata from commercial sources. When this metadata is synchronized properly with previously described network data, the result is highly accurate geospatial power outage information that can be acted upon.

Figure 1:
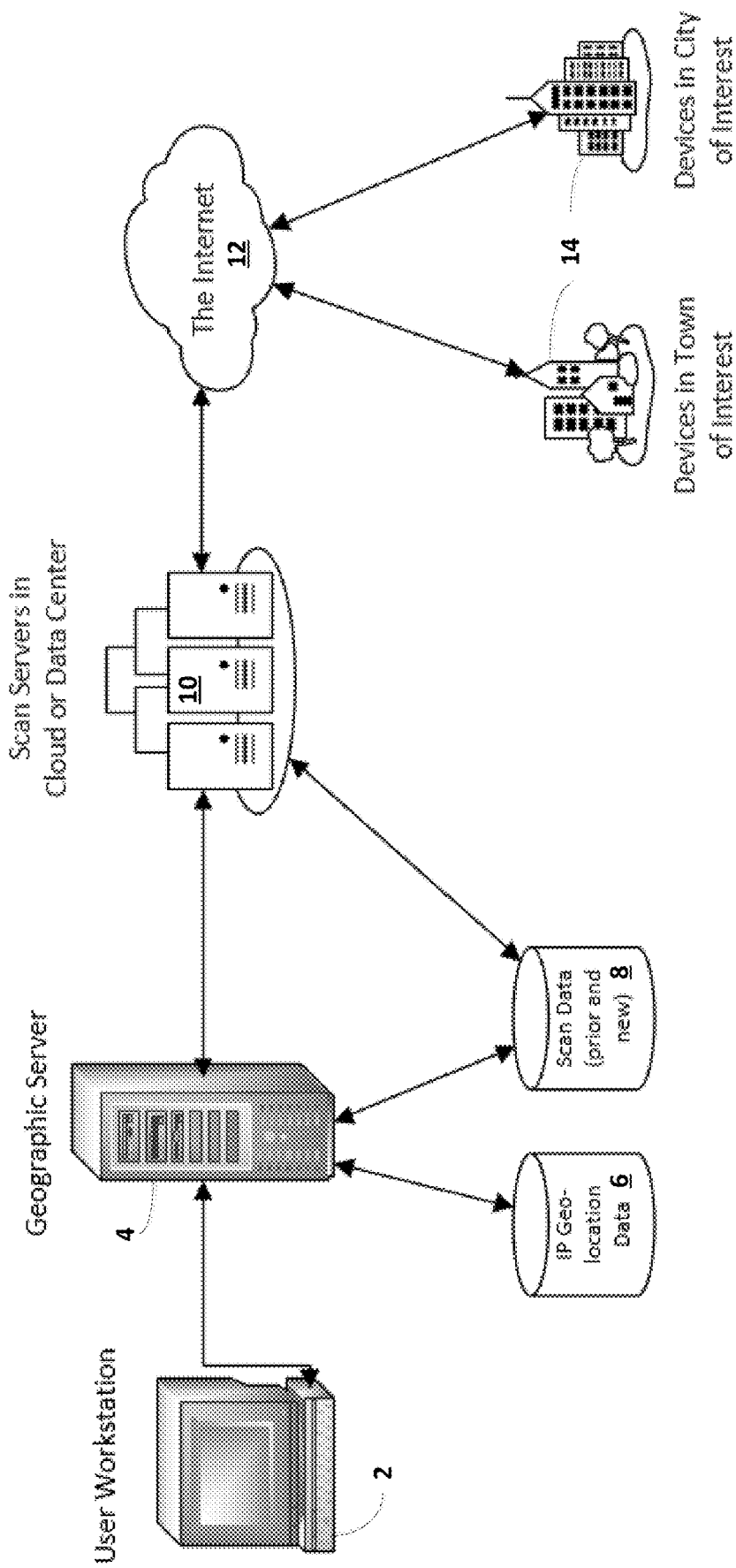
FIG. 1 is a schematic diagram of a network in which the present system and method may be provided in accordance with one exemplary embodiment of the invention.

FIG. 1 is a schematic diagram of a network 1 in which the present system and method may be provided. It should be noted that the processes described herein can be executed directly on commodity hardware or within virtual machines, either local to the user or hosted within cloud services. The processes may be run on one or more physical or virtual machines, provided the machines have the requisite RAM, disk storage, CPU, and network bandwidth to support the processes. It is also noted that functionality described herein as being performed on different devices may instead be performed on fewer devices or a single device.

Referring to FIG. 1, the network contains a user workstation 2 that may be used by a user for interacting in accordance with the present system and method. The user workstation 2 provides a user interface necessary to interact with the system (e.g. to specify a geographic area of interest, desired geographic boundary units, which results to visualize, viewing the results, etc.). The user interface provided by the user workstation 2 is preferably a graphical user interface. In addition, the user workstation 2 may simply be a basic thin terminal providing Web access, wherein the graphical user interface provides the user with the ability to interact with a server based system (e.g., a geographic server).

The network also contains a geographic server 4, which the user workstation 2 communicates with in accordance with the present system and method. The geographic server 4 supports a number of the processes described with reference to the method of FIG. 3. Specifically, the geographic server 4 provides for gathering of IP addresses of devices and sets of such IP addresses, referred to as IP network addresses, within a user specified geographical region (also referred to herein as a network whitelist), creating of a pre-incident baseline of geo-relevant IP network addresses, providing the network whitelist to scanners, storing new measurement results, analyzing the new measurement results, calculating a percentage of normal operation, and visualizing results for the user in accordance with selected geographic regions of interest.

The processes supported by the geographic server 4 require access to a high-accuracy IP geo-location database 6, which must be updated periodically to reflect changes in network information. The processes supported by the geographic server also require access to a data store 6 of previous network data measurements (for calculating the baseline values), as well as a data store of new network measurements (which will be compared to the baselines). As explained herein, operation of the database likely will be provided by a third party, although the present invention in not limited as such.

Scan servers 10 are provided within the network, which support the process of scanning networks identified in the network whitelists. They may reside locally or remotely, potentially in a data center or cloud service. The scan servers 10 require sufficient network bandwidth to send and receive scan probes at a specified rate without losing network packets. The scan probes travel through the Internet to devices with IP addresses that belong to the networks 14 in the network whitelist, which reside in towns and cities within the targeted geographic region selected by the user. The scan responses travel back through the Internet 12 from the scanned devices 14 to the scan servers 10. The scan results are kept in a data store 8 to which the geographic server 4 processes have access. Of course, storage of data may be provided within the scan servers 10 or the graphic server 4, instead of having a separate storage unit 8.

Figure 2:
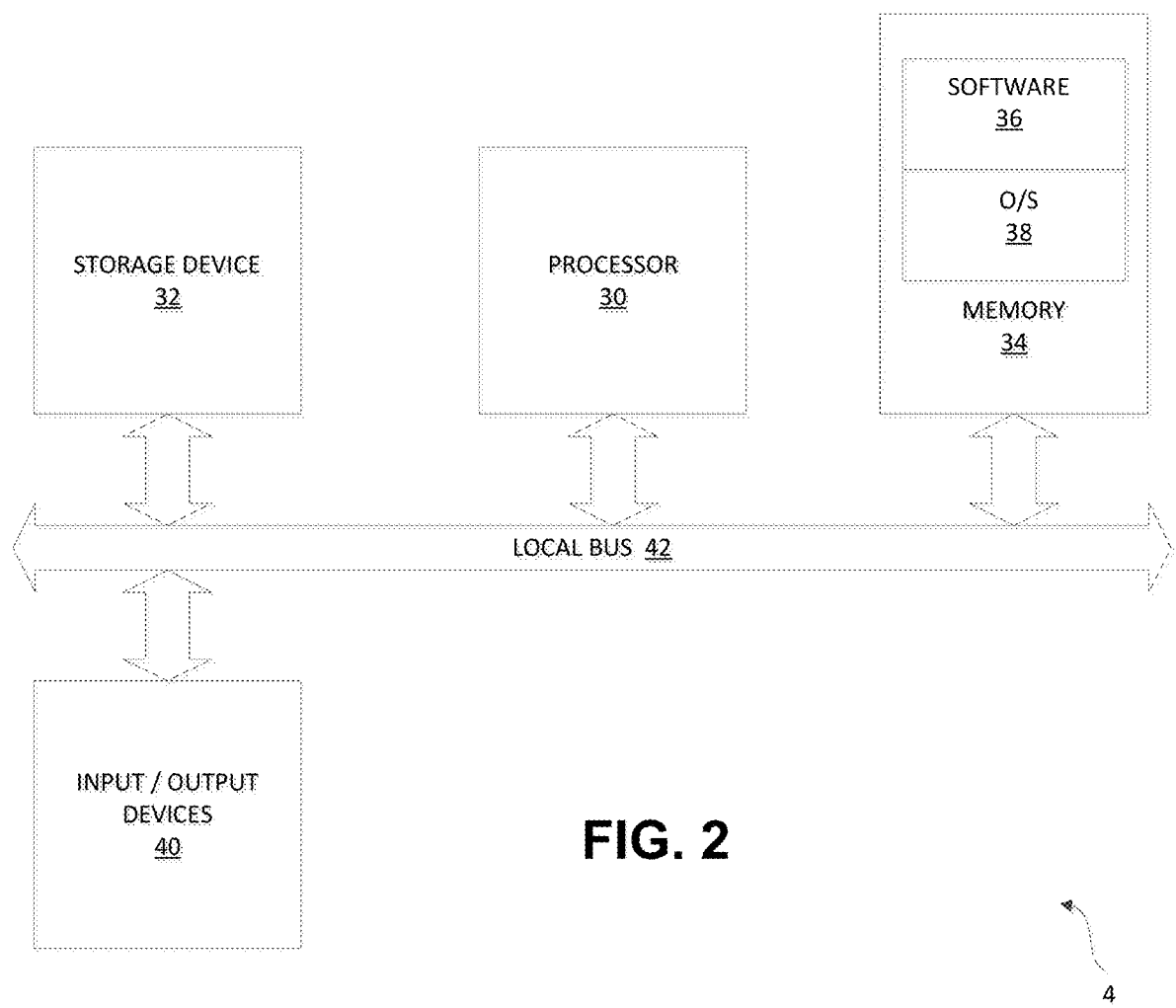
FIG. 2 is a schematic diagram further illustration one example of the geographic server of FIG. 1.

FIG. 2 is a schematic diagram providing basic structure that may be used for the geographic server 4. The geographic server 4 may contain a processor 30, a storage device 32, a memory 34 having software 36 stored therein that defines the functionality of the geographic server 4, input and output (I/O) devices 40 (or peripherals), and a local bus, or local interface 42 allowing for communication within the system geographic server 4. The local interface 42 can be, for example but not limited to, one or more buses or other wired or wireless connections, as is known in the art. The local interface 42 may have additional elements, which are omitted for simplicity, such as controllers, buffers (caches), drivers, repeaters, and receivers, to enable communications. Further, the local interface 42 may include address, control, and/or data connections to enable appropriate communications among the aforementioned components.

The processor 30 is a hardware device for executing software, particularly software including non-transient processor instructions stored in the memory 34. The processor 30 can be any custom made or commercially available single core or multi-core processor, a central processing unit (CPU), an auxiliary processor among several processors associated with the present server 4, a semiconductor based microprocessor (in the form of a microchip or chip set), a macroprocessor, or generally any device for executing software instructions.

The memory 34 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 34 may incorporate electronic, magnetic, optical, and/or other types of storage media. Note that the memory 34 can have a distributed architecture, where various components are situated remotely from one another, but can be accessed by the processor 30.

The software 36 defines functionality performed by the geographic server 4, in accordance with the present invention. The software 36 in the memory 34 may include one or more separate programs, each of which contains an ordered listing of executable instructions for implementing logical functions of the server 4, as described below. In some embodiments, the memory 34 may contain an operating system (O/S) 38. The operating system essentially controls the execution of programs within the server 4 and provides scheduling, input-output control, file and data management, memory management, and communication control and related services.

The I/O devices 40 may include input devices, for example but not limited to, a keyboard, mouse, scanner, microphone, etc. Furthermore, the I/O devices 40 may also include output devices, for example but not limited to, a printer, display, etc. Finally, the I/O devices 40 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the geographic server 4 is in operation, the processor 30 is configured to execute the software 36 stored within the memory 34, to communicate data to and from the memory 34, and to generally control operations of the system 4 pursuant to the software 36, as explained above.

When the functionality of the geographic server 4 is in operation, the processor 30 is configured to execute the software 36 stored within the memory 34, to communicate data to and from the memory 34, and to generally control operations of the geographic server pursuant to the software 36. The operating system 38 is read by the processor 30, perhaps buffered within the processor 30, and then executed.

When the geographic server 4 is implemented in software 36, it should be noted that instructions for implementing the functionality of the server 4 can be stored on any computer-readable medium for use by or in connection with any computer-related device, system, or method. Such a computer-readable medium may, in some embodiments, correspond to either or both the memory 34 or the storage device 32. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 30 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where functionality of the geographic server 4 is implemented in hardware, the geographic server 4 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
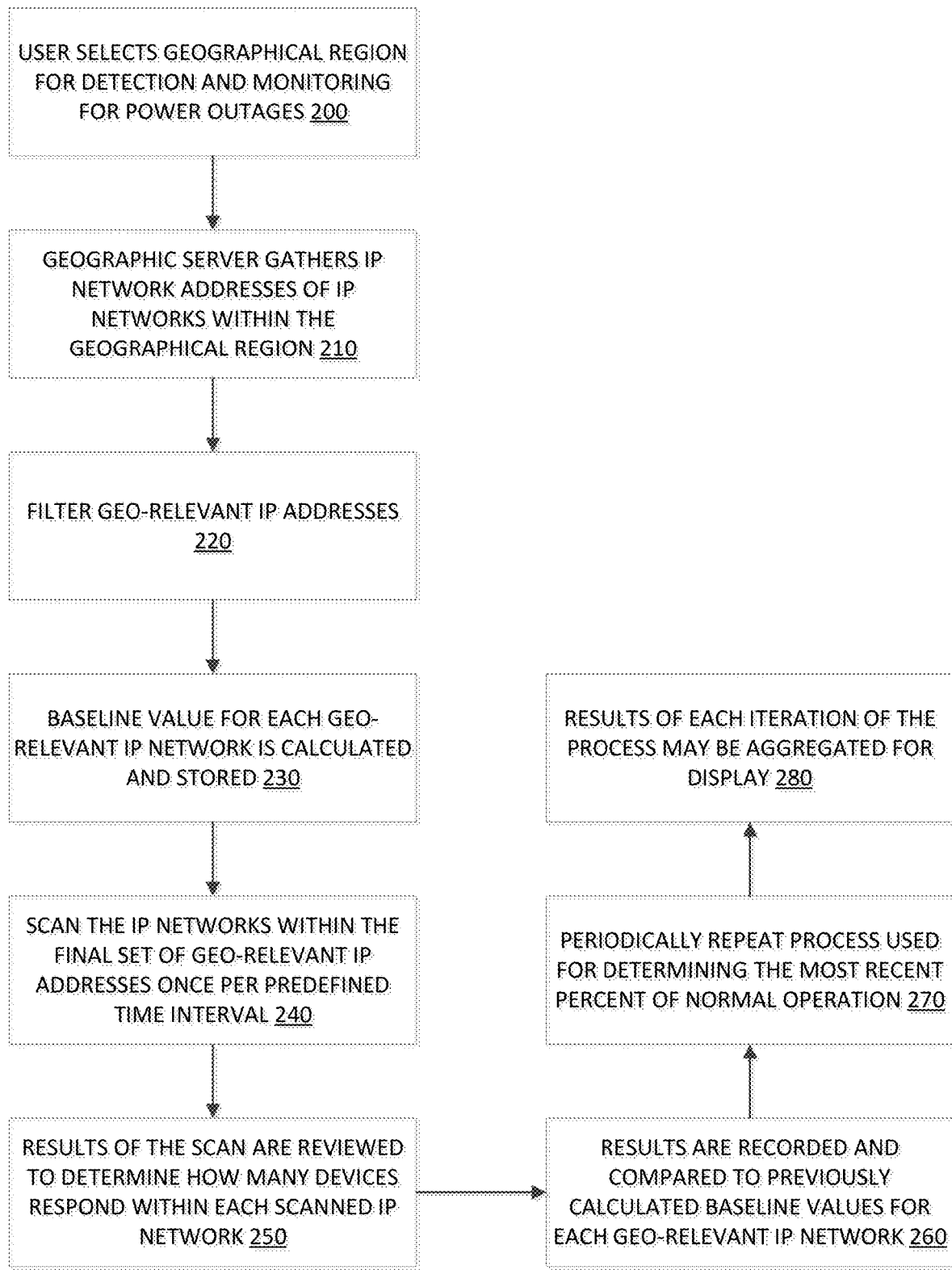
FIG. 3 is a flowchart showing the process used by the present system and method to allow for detecting of power outages using network data.

FIG. 3 is a flowchart showing the process used by the present system and method to allow for detecting of power outages using network data. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 200, a user of the present system and method uses a graphical user interface (GUI) provided by the geographic server 4 (FIG. 1) and viewed via the user workstation 2 (FIG. 1) to select a geographical region in which to detect and monitor power outages, also referred to herein as a target geographical area of interest. Such an area may be one that may be of interest during extreme weather.

An example of selection may include the geographic server 4 (FIG. 1) providing a map that the user may interact with via the user workstation 2 to highlight a specific region within the map. Alternatively, map coordinates or names of specific regions may be provided by the user of the user workstation 2 (FIG. 1) to specify the geographical region in which to detect and monitor power outages. Of course, one of ordinary skill in the art will appreciate that one of many other methods may be utilized for selection of the geographical region.

As shown by block 210, after selection of the geographical region, the geographic server 4 (FIG. 1) gathers Internet protocol (IP) network addresses, such as in Classless Inter-Domain Routing notation (CIDR), of IP networks within the geographical region. Such IP networks may encompass many devices, including, but not limited to, cable boxes, home routers, set top boxes, any internet of things devices, or any devices connected to the Internet. The IP network addresses within the selected geographical region are referred to herein as geo-relevant IP addresses or geo-relevant IP networks. One having ordinary skill in the art would appreciate that an IP network contains a set or multiple subsets of IP addresses.

It should be noted that while the present embodiment is described as utilizing IP network addresses, the present system and method may instead utilize individual IP addresses, although doing so could be more processor intense.

Gathering of the geo-relevant IP addresses may be performed by, for example, using a commercially available product such as, but not limited to, that provided by MaxMind of Massachusetts, or another highly-accurate database containing IP network information, which provides location data for IP network addresses in a specific region. Alternatively, the gathering of geo-relevant IP addresses may be performed in another known method, where the gathered IP addresses are obtained from another source, such as from Internet Service Providers (ISPs) who serve the geographic area of interest. It is also noted that gathering of IP addresses should be performed when there is no power outage in the selected geographical region, also referred to herein as "pre-incident".

As shown by block 220, filtering of the geo-relevant IP addresses may be performed before calculating pre-incident baseline values for use by the present system and method, in the manner described herein. This step may be performed if it is beneficial to limit the IP addresses being monitored to devices of a specific category. For example, if monitoring for power outages of places of residence, it may be beneficial to have filtering customized so as to result in the IP addresses of home devices. In this manner, the present system and method can be utilized for detecting power outages in home devices.

Filtering before calculating a baseline value for each geo-relevant IP network may include multiple steps that are preferably performed at a time when there is not a power outage. For example, a first step of filtering may be to filter out geo-relevant IP addresses that have not been active over a predefined time period. For instance, if an IP network has a historical response rate of zero or very few devices showing activity when monitored during a time period, such as the prior three months, then it may be beneficial to exclude that IP network from the set of geo-relevant IP addresses; in this case, no baseline value will be calculated for that IP network and no future monitoring of that IP network will be performed.

A second step of filtering may include the selection of specific ports to which TCP/IP packets, and/or other packet types, will be transmitted and from which responses will be received during the scanning steps. Specific ports may be selected, for example, based on classifications of devices that the user wishes to monitor for purposes of determining whether a power outage has taken place. As an example, if a TCP/IP packet is transmitted to port 80 and the device responds, this means that the device is active and running a web server. In application, the process of transmitting to and receiving from specific ports may be performed multiple times over a time period so as to obtain a predefined ratio of confirmations illustrating that a particular IP device or IP network is active enough to be included in the set of geo-relevant IP addresses. For example, the transmitting to and receiving from a specific port of a specific device, or set of devices encompassed by an IP network, may be performed five times over the course of five weeks, where an active status is required four out of the five times prior to the associated geo-relevant IP address or IP network being included in the final set of geo-relevant IP addresses.

It should be noted that the step of filtering need not contain both the time limitation filtering and the specific port filter. Instead, one or the other step of filtering may be used, both may be used, or neither may be used. It should also be noted that should the block 210 initial set of geo-relevant IP addresses all fall within the filtered criteria, the initial set of geo-relevant IP addresses would also be the final set of geo-relevant IP addresses.

The result after filtering is the final set of geo-relevant IP addresses for which baseline values will be calculated and which will be monitored in subsequent steps. Geo-relevant IP addresses that respond on the specific ports scanned are counted in the calculated baseline for each geo-relevant IP network. For example, a mean historical response value, which is representative of normal network operation, can be used to represent the historical activity of each IP network in the set of geo-relevant IP addresses. As shown by block 230 the baseline value for each geo-relevant IP network is calculated and stored on a server within the cloud. Alternatively, if the present system and method is not provided using a cloud-based network, the baseline may be stored on a local server.

As shown by block 240, processes running on the scan servers 10 (FIG. 1) then scan the IP networks within the final set of geo-relevant IP addresses once per predefined time interval. As a non-limiting example, TCP/IP packets may be transmitted to each IP address encompassed by each IP network within the final set of geo-relevant IP addresses every two hours, seeking responses to the transmissions. The results of the scan are then reviewed to determine how many devices respond within each scanned IP network (block 250). Such results are then recorded and compared to the previously calculated baseline values for each geo-relevant IP network so as to determine a ratio of currently responding devices to historically responding devices, hereafter referred to as the percent of normal operation (block 260). The percent of normal operation across all IP networks in a geographic region corresponds to the estimated percent of customers who have power within the same geographic region. Of course, other methods of comparing prior responses to current responses of devices within the final set of geo-relevant IP addresses may be provided and fall within the present invention.

As shown by block 280, after determination of the current percent of normal operation for each IP network in the final set of geo-relevant IP addresses, the present system and method periodically repeats the process used to determine the most recent percent of normal operation. Specifically, new transmissions are made, and responses recorded, on the same ports previously used for each IP address encompassed by each IP network within the final set of geo-relevant IP addresses. The periodic repetition of the process provides a mechanism to monitor the status of power outages over time. A decrease in the percent of normal operation corresponds with an increase in power outages, whereas an increase in the percent of normal operation corresponds with power restoration As shown by block 290, the results of each iteration of the process may be aggregated for display to a user of the system. In one such method of visualization, the user may choose an aggregation level, including but not limited to a town or county. For a given aggregation level, the subset of IP networks, with respect to the final set of geo-relevant IP addresses, that geo-locate to within each aggregation unit is determined, and is hereafter referred to as the unit's network aggregation set. For instance, if the chosen aggregation level is a town, then a town's network aggregation set consists of the subset of networks, with respect to the final set of geo-relevant IP addresses, that geo-locate to within that town. The percent of normal operation for each network within a network aggregation set is combined to form a percent of normal operation for the aggregation unit as a whole. One such method of combining the percent of normal operation for each network within a network aggregation set is to calculate the mean value of all ratios of normal operation, which can be represented as a percent. Of course, other methods of combining ratios of normal operation may be provided and fall within the present invention. For instance, the percent of normal operation for some networks in a network aggregation set may be weighted more heavily than the percent of normal operation for other networks within that network aggregation set.

In one method of visualization, the percent of normal operation for each aggregation unit is mapped to a color scale, and each aggregation unit on a map is filled in with the color corresponding to its percent of normal operation. For instance, a very low percent of normal operation, such as in the range from zero to ten percent, may be mapped to a dark red color, and any town for which the aggregated percent of normal operation is calculated to be within this range will be colored dark red on a map displayed to the user of the system. Furthermore, the results of each iteration of the process may be displayed sequentially in order to monitor the progress of power outages over time, including but not limited to one iteration at a time as chosen by the user of the system, or as an automated sequence of iterations that span a specified time period. Another method of visualization may display a graph of an aggregation unit's percent of normal operation over time. Of course, other methods of displaying aggregated results may be provided and fall within the present invention.

Figure 4:
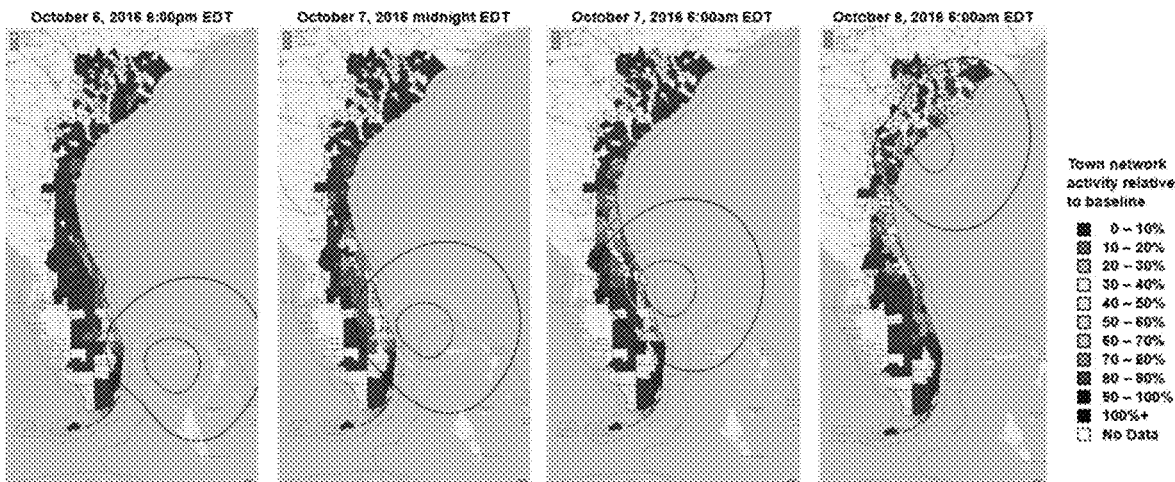
FIG. 4 is an exemplary screen display illustrating "percentage of normal activity" forecasts for locations and extent of power outages, as provided by the present system and method.

FIG. 4 is an exemplary screen display illustrating "percentage of normal activity" forecasts for locations and extent of power outages, as provided by the present system and method. Here we can see percentages declining along the path of Hurricane Matthew in the southeast coastal US, which correlates closely with reported power outages.

Figure 5:
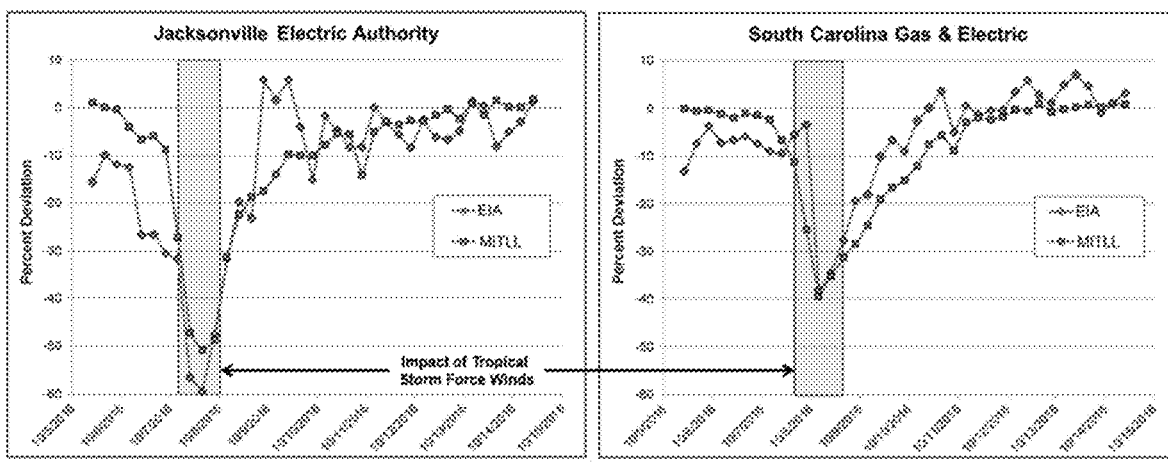
FIG. 5 is a graphical display providing calculated percent change in normal activity compared to US Energy Information Administration (EIA) balancing authority data in the areas covered by Jacksonville Electric Authority and South Carolina Gas & Electric.

FIG. 5 is a graphical display providing calculated percent change in normal activity compared to US Energy Information Administration (EIA) balancing authority data in the areas covered by Jacksonville Electric Authority and South Carolina Gas & Electric. The EIA data points represent the percent difference between actual and forecasted electricity demand.

Figure 6:
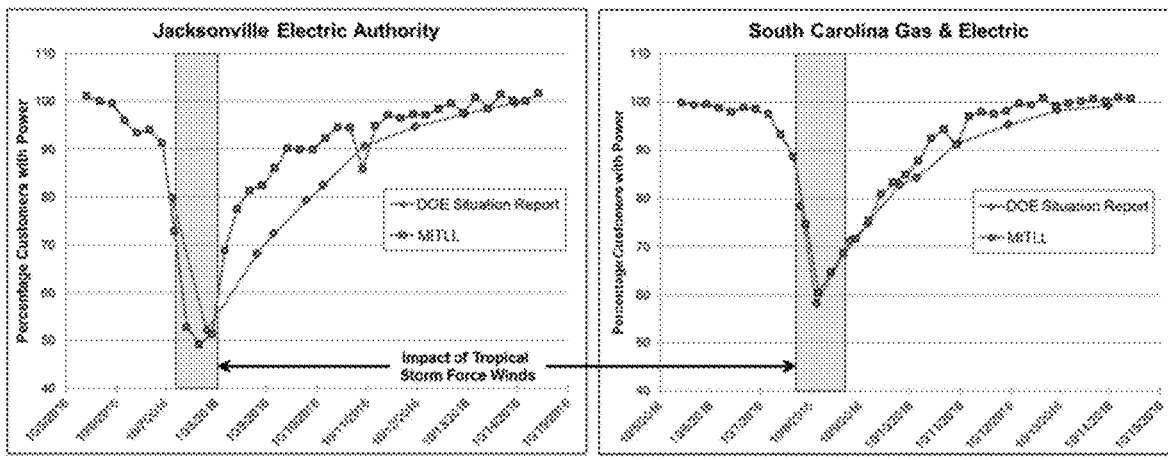
FIG. 6 is a graphical display comparing the calculated "percentage of normal activity" to the percentage of customers with power in the regions served by Jacksonville Electric Authority and South Carolina Gas & Electric as determined from Department of Energy (DOE) situation reports, issued daily during Hurricane Matthew.

FIG. 6 is a graphical display comparing the calculated "percentage of normal activity" to the percentage of customers with power in the regions served by Jacksonville Electric Authority and South Carolina Gas & Electric as determined from Department of Energy (DOE) situation reports, issued daily during Hurricane Matthew. DOE situation reports provide the number of customers without power, which we can subtract from total customers served to obtain the number, and percentage, of customers with power.

In accordance with one alternative embodiment of the invention, it should be noted that an additional step may be provided by the geographic server of expanding checking from IP network addresses, to availability of individual devices within the selected IP network addresses.

The present system and method allows for producing of a near real-time geospatial power outage map. This geospatial information is valuable to electric utilities, emergency management agencies, and other agencies. Electric utilities will find the present system and method of particular interest if they do not have AMI and associated infrastructure for real-time monitoring, as it can provide them with a faster and more consistent system and method for determining where power outages exist and how to prioritize repairs. Emergency management agencies at the county, state, regional, and national levels are all potential users of the present system and method as they require situational awareness after a disaster to create a response plan, allocate resources, and prioritize recovery operations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. A method for cyber sensing for power outage detection, comprising the steps of:

receiving a selected geographic region for detection and monitoring of a power outage;

gathering Internet Protocol (IP) network prefixes of IP networks within the selected geographical region to generate a plurality of geo-relevant IP network prefixes and a corresponding plurality of all geo-relevant IP device addresses of the geo-relevant IP network prefixes;

calculating a baseline value comprising a corresponding total number of historically responding geo-relevant IP device addresses;

scanning each of the plurality of geo-relevant IP device addresses once per a predefined time interval to generate one or more scan results, the scanning further comprising:

transmitting a network packet to each of the plurality of geo-relevant IP device addresses;

testing for a response to the transmitting from each of the plurality of filtered geo-relevant IP device addresses;

determining a number of responding devices that positively respond to the testing; and comparing the number of responding devices with the baseline value, wherein each IP device address of the plurality of all geo-relevant IP device addresses comprises all fields of an IP address for a corresponding IP network prefix, and transmitting the network packet further comprises transmitting the network packet to a selected port of each of the plurality of geo-relevant IP device addresses, and the selected port is correlated with a power status of the corresponding geo-relevant IP device.

2. The method of claim 1, further comprising a step of displaying the one or more scan results.

3. The method of claim 1, wherein gathering the plurality of geo-relevant IP network prefixes further comprises excluding geo-relevant IP prefixes that have not been active over a predefined time period.

4. The method of claim 1, wherein the scanning further comprises receiving a response from the selected port.

5. The method of claim 1, wherein the step of calculating a baseline value includes receiving the selected geographic region for detection and monitoring before the power outage.

6. The method of claim 1, wherein the plurality of geo-relevant IP network prefixes are within a user-specified geographical region.

7. The method of claim 1, wherein the method further includes measuring an element of IP network data.

8. The method of claim 1, wherein the one or more scan results are accessible by a geographic server.

9. The method of claim 8, wherein the geographic server is configured to indicate an availability of a device.

10. The method of claim 1, wherein the step of gathering includes gathering one or more individual IP device addresses.

11. The method of claim 1, wherein the step of gathering includes filtering the plurality of geo-relevant IP network prefixes ahead of calculating the baseline value before the power outage.

12. The method of claim 1, wherein the step of testing includes estimating a threshold of a ratio of confirmation from a port responding to a transmission.

13. The method of claim 12, wherein the port is one of a currently-responding port and an historically-responding port.

14. A system having a specially-programmed processor configured to perform:
    receiving a selected geographic region for detection and monitoring of a power outage;
    gathering Internet Protocol (IP) network prefixes of IP networks within the selected geographical region to generate a plurality of geo-relevant IP network prefixes and a corresponding plurality of all geo-relevant IP device addresses of the geo-relevant IP network prefixes;
    calculating a baseline value comprising a corresponding total number of historically responding geo-relevant IP device addresses;
    scanning each of the plurality of geo-relevant IP device addresses once per a predefined time interval to generate one or more scan results, the scanning further comprising:
        transmitting a network packet to each of the plurality of geo-relevant IP device addresses;
        testing for a response to the transmitting from each of the plurality of filtered geo-relevant IP device addresses;
        determining a number of responding devices that positively respond to the testing; and
        comparing the number of responding devices with the baseline value,
    wherein each IP device address of the plurality of all geo-relevant IP device addresses comprises all fields of an IP address for a corresponding IP network prefix,
    wherein transmitting the network packet further comprises transmitting the network packet to a selected port of each of the plurality of geo-relevant IP device addresses, and the selected port is correlated with a power status of the corresponding geo-relevant IP device.

15. The system of claim 14, further configured to display the one or more scan results.

16. The system of claim 14, wherein gathering the plurality of geo-relevant IP network prefixes further comprises excluding geo-relevant IP prefixes that have not been active over a predefined time period.

17. The system of claim 14, further configured to receive a response from the selected port.

18. The system of claim 14, further configured to receive the selected geographic region for detection and monitoring before the power outage.

19. The system of claim 14, wherein the plurality of geo-relevant IP network prefixes are within a user-specified geographical region.

20. The system of claim 14, further configured to measure an element of IP network data.

21. The system of claim 14, wherein the one or more scan results are accessible by a geographic server.

22. The system of claim 21, wherein the geographic server is configured to indicate an availability of a device.

23. The system of claim 14, further configured to gather one or more individual IP device addresses.

24. The system of claim 14, further configured to filter the plurality of geo-relevant IP network prefix ahead of calculating the baseline value before the power outage.

25. The system of claim 14, further configured to estimate a threshold of a ratio of confirmation from a port responding to a transmission.

26. The system of claim 25, wherein the port is one of a currently-responding port and an historically-responding port.

27. A nonvolatile memory having non-transient processor instructions, that when executed by a processor perform the steps of:
    receiving a selected geographic region for detection and monitoring of a power outage;
    gathering Internet Protocol (IP) network prefixes of IP networks within the selected geographical region to generate a plurality of geo-relevant IP network prefixes and a corresponding plurality of all geo-relevant IP device addresses of the geo-relevant IP network prefixes;
    calculating a baseline value comprising a corresponding total number of historically responding geo-relevant IP device addresses;
    scanning each of the plurality of geo-relevant IP device addresses once per a predefined time interval to generate one or more scan results, the scanning further comprising:
        transmitting a network packet to each of the plurality of geo-relevant IP device addresses;
        testing for a response to the transmitting from each of the plurality of filtered geo-relevant IP device addresses;
        determining a number of responding devices that positively respond to the testing; and
        comparing the number of responding devices with the baseline value,
    wherein each IP device address of the plurality of all geo-relevant IP device addresses comprises all fields of an IP address for a corresponding IP network prefix, and transmitting the network packet further comprises transmitting the network packet to a selected port of each of the plurality of geo-relevant IP device addresses, and the selected port is correlated with a power status of the corresponding geo-relevant IP device.

\* \* \* \* \*